(12) United States Patent
Massey et al.

(10) Patent No.: US 7,782,461 B1
(45) Date of Patent: Aug. 24, 2010

(54) FLOW RATE MEASURING DEVICE

(76) Inventors: Sean J. Massey, 7414 E. Pinto Way, Orange, CA (US) 92869; Robert P. Baeyens, 19273 Canyon Dr., Villa Park, CA (US) 92861; Donald K. Henderson, 4223 Rutgers Ave., Long Beach, CA (US) 90808; Robert D. Moss, 5314 W. 138th St., Hawthorne, CA (US) 90250

( * ) Notice: Subject to any disclaimer, the term of this patent is extended or adjusted under 35 U.S.C. 154(b) by 679 days.

(21) Appl. No.: 11/697,149

(22) Filed: Apr. 5, 2007

(51) Int. Cl.
*G01N 21/00* (2006.01)
*G01P 3/40* (2006.01)
*G01F 1/00* (2006.01)
*G01F 1/37* (2006.01)
*G01F 1/22* (2006.01)

(52) U.S. Cl. .......................... 356/436; 356/28; 356/440; 73/861; 73/861.52; 73/861.57; 73/861.58

(58) Field of Classification Search ....................... None
See application file for complete search history.

(56) References Cited

U.S. PATENT DOCUMENTS

| | | | | |
|---|---|---|---|---|
| 2,912,858 A * | 11/1959 | Fuller | ...................... | 73/861.56 |
| 3,150,360 A * | 9/1964 | Stenzel | .......................... | 73/198 |
| 3,320,804 A * | 5/1967 | Halberstam | ................... | 73/861 |
| 3,885,434 A * | 5/1975 | Williamson | ............... | 73/861.21 |
| 4,003,255 A * | 1/1977 | Spencer | .................... | 73/861.71 |
| 4,550,314 A * | 10/1985 | Stenzel et al. | ................ | 340/623 |
| 4,630,485 A * | 12/1986 | Wastl, Sr. | ................ | 73/861.56 |
| 5,116,119 A * | 5/1992 | Brayer | ......................... | 356/28 |
| 5,139,044 A * | 8/1992 | Otten et al. | .................... | 137/80 |
| 5,142,271 A * | 8/1992 | Bailey et al. | ................. | 340/606 |
| 5,186,058 A * | 2/1993 | Lew | ......................... | 73/861.56 |
| 5,379,651 A * | 1/1995 | Doolittle | ................... | 73/861.56 |
| 5,576,486 A * | 11/1996 | Paz | .............................. | 73/197 |
| 5,638,174 A * | 6/1997 | Henderson | .................. | 356/343 |
| 5,820,715 A * | 10/1998 | Singleterry et al. | ......... | 156/73.1 |
| 6,128,072 A * | 10/2000 | Kiel et al. | ...................... | 356/28 |
| 6,321,604 B1 * | 11/2001 | Jackson et al. | ........... | 73/861.56 |
| 6,769,310 B2 * | 8/2004 | Carlson | .................... | 73/861.57 |
| 7,140,262 B1 * | 11/2006 | Vaughn et al. | ........... | 73/861.57 |
| 7,292,945 B2 * | 11/2007 | Wargo et al. | ................... | 702/50 |
| 2006/0101922 A1 * | 5/2006 | Niimi et al. | ............... | 73/861.57 |

* cited by examiner

*Primary Examiner*—Tarifur Chowdhury
*Assistant Examiner*—Gordon J Stock, Jr.
(74) *Attorney, Agent, or Firm*—Klein, O'Neill & Singh, LLP

(57) ABSTRACT

A flow metering device and method for monitoring flow of a liquid, has a body with an inlet port and an outlet port. A flow chamber is formed therein between a pair of laterally placed windows in the flow chamber. A light emitting source placed in one of the windows and a light receiver placed in a second of the windows. The flow chamber has a flow restricting and light stopping element held therein and movable between a rest position and an operating position.

17 Claims, 5 Drawing Sheets

FLOW RATE MEASURING DEVICE

1. FIELD OF THE INVENTION

The present invention relates to a flow-metering device, and more particularly, to an apparatus for and method of accurately monitoring the quantity of fluid dispensed through a tube/pipe over a certain amount of time.

2. DESCRIPTION OF THE PRIOR ART

Some beverage dispensers operate by combining beverages fluids to form a desired drink, such as lemonade, orange juice, cola and the like. Typically, a beverage concentrate is combined with a mixing fluid, such as carbonated water, to form a desired drink. The beverage dispenser dispenses the drink through a dispensing valve. Some drinks, like beer, are dispensed directly from the beer container/keg through the fluid lines and out the dispenser. It is necessary for the management of establishments such as bars, taverns, restaurants, and the like to carefully monitor the amount of beverage dispensed.

There are many systems and methods for measuring and integrating flow of a liquid from a liquid dispenser. However, current methods and systems do not provide simple and cost effective means of measuring flow of beverages. Especially, it is particularly cumbersome to monitor the flow of aerated or carbonated beverages and draft beers. Further, the current methods involve reducing pressure of the flowing liquid. This reduction in pressure increases incidence of foam in the beverage. Increased foam may be acceptable in flow of certain fluids, however, is not preferred in draft beer and similar other aerated or carbonated beverages and is known to throw off the flow measurement.

The current apparatus and methods available for measuring flow of aerated or carbonated beverages or draft beer are complex and require extensive set-up costs. There is need for a device that measures flow of aerated or carbonated beverages or draft beer accurately and cost effectively. There is a need for a flow metering device which is self contained, tamperproof, accurate, durable, easy to install, inexpensive and invisible to the customer.

Therefore, there is a need in the art for a method and apparatus that measures flow of a liquid without dropping the pressure of the fluid flow significantly, which substantially eliminates foaming and is inexpensive to manufacture and adapt to current available and known set-ups.

SUMMARY OF THE INVENTION

Accordingly, it is a general object of the present invention to provide an apparatus and method for measuring flow of a liquid from a liquid dispensing device. It is a particular object of the present invention to provide a flow metering device for measuring flow of liquid, particularly flow of aerated beverages. It is a further particular object of the present invention to provide a flow metering device utilizing light to accurately measure the flow of liquid, particularly flow of aerated beverages.

And it is another particular object of the present invention to provide a method for accurately monitoring flow of a liquid utilizing light and a movable light stopping object in a flow chamber through which the liquid flows.

This brief summary has been provided so that the nature of the invention may be understood quickly. A more complete understanding of the invention may be obtained by reference to the following detailed description of the preferred embodiments thereof in connection with the attached drawings.

BRIEF DESCRIPTION OF THE DRAWINGS

The present invention, both as to its organization and manner of operation, together with further objects and advantages, may best be understood by reference to the following description, taken in connection with the accompanying drawings. In the drawings, the same components have the same reference numerals. The illustrated embodiment is intended to illustrate, but not to limit the invention. The drawings include the following Figures.

DESCRIPTION OF THE PREFERRED EMBODIMENTS

Figure 1A:
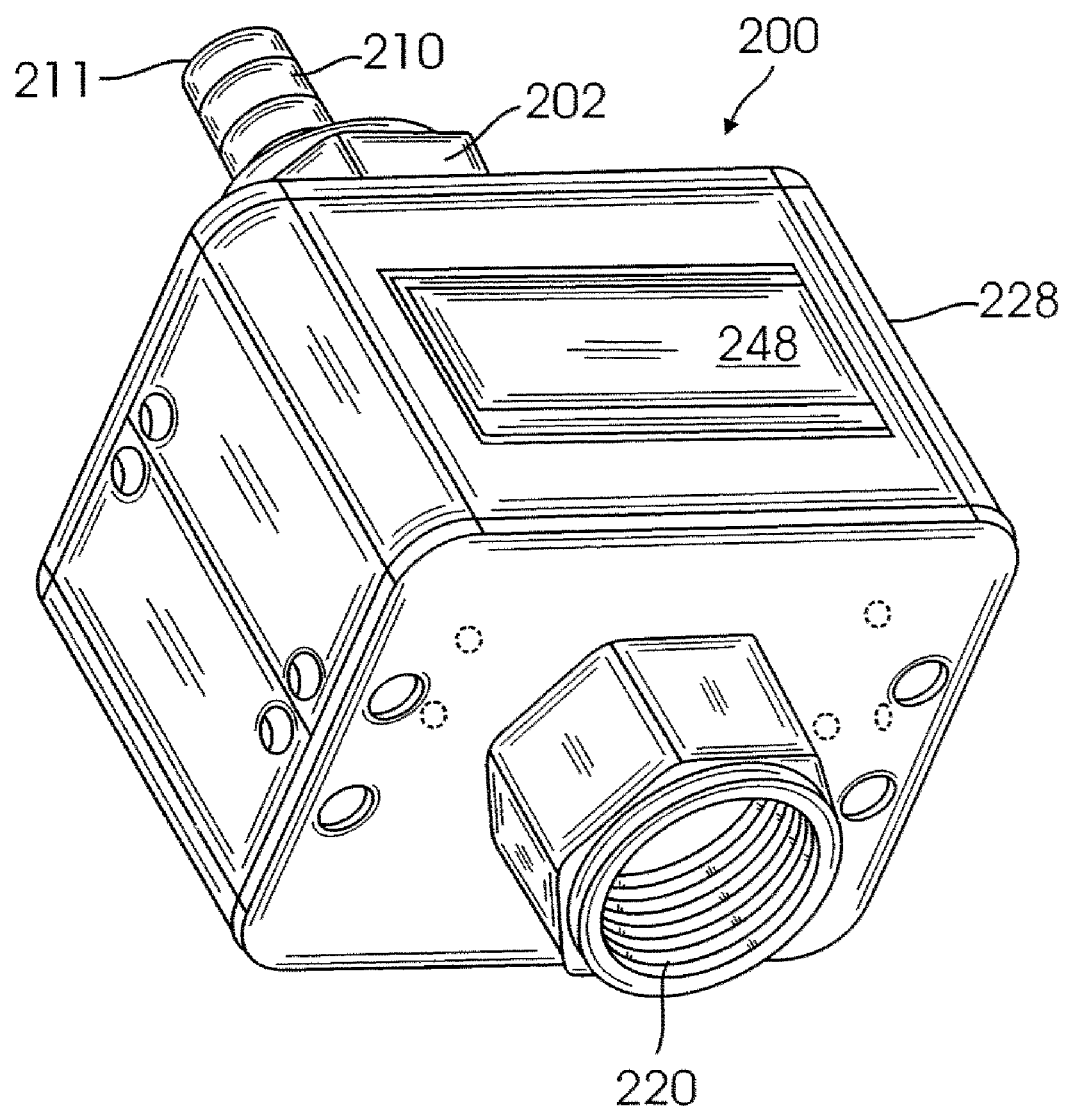
FIG. 1A is a front elevational view of the flow metering device of the present invention.

The following description is provided to enable any person skilled in the art to make and use the invention and sets forth the best modes contemplated by the inventors of carrying out their invention. Various modifications, however, will remain readily apparent to those skilled in the art, since the generic principles of the present invention have been defined herein specifically to provide for a flow-metering device and method for accurately measuring flow of liquid from a liquid dispensing unit by utilizing light. The liquid dispensing unit may be a beer keg or any type of liquid dispensing line known in the art.

FIGS. 1A-2C shows a flow-metering device 200 that may be used in beverage dispensing lines or beverage dispensing kegs. The flow-metering device comprises an internal body portion 202 having a first or outlet port 210, an external cover or housing portion 228 enclosing the internal body portion 202, a second or inlet port 220, a stop 221, such as a ball stop or the like, inserted and held in the first port 210 and an optical display 248 held in the external cover or housing and connected to a circuit board, or the like held in the external cover or housing portion 228. The stop 221 is sized and dimensioned to allow unrestricted flow of fluid there through, but to stop movement of a light stopping object 250, described below. The first port 210 may be held in, formed as or connected to a dispensing pipe 211 or a conventional dispensing tap (not shown). The first port 210 preferably dispenses fluid from the flow-metering device 200 to a dispensing tap, after traveling through a flow chamber 230 from the second port 220. The fluid or liquid flows past the light stopping object 250 and the stop 221.

The second port 220 may receive the liquid directly from a source, such as a keg or the like, or passing through a line (neither of which are shown).

The flow chamber 230 comprises a chamber between a pair of window openings 232 and 242. The window openings 232 and 242 are provided at laterally opposite ends or sides of the flow chamber 230. A light emitting source 234 is placed in a first window opening 232 and a light receiver or light sensors 244 placed in a second window opening 242. The light emitting source 234 is a light emitting diode, an incandescent lamp, or some other light source.

Figure 2A:
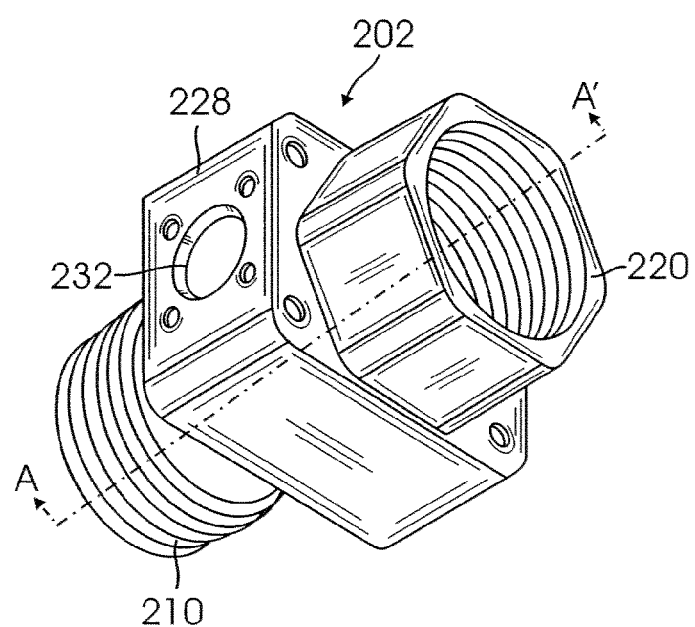
FIG. 2A is a perspective view of the internal portion of the flow metering device shown in FIG. 1A, without the outside housing thereon.
Figure 2B:
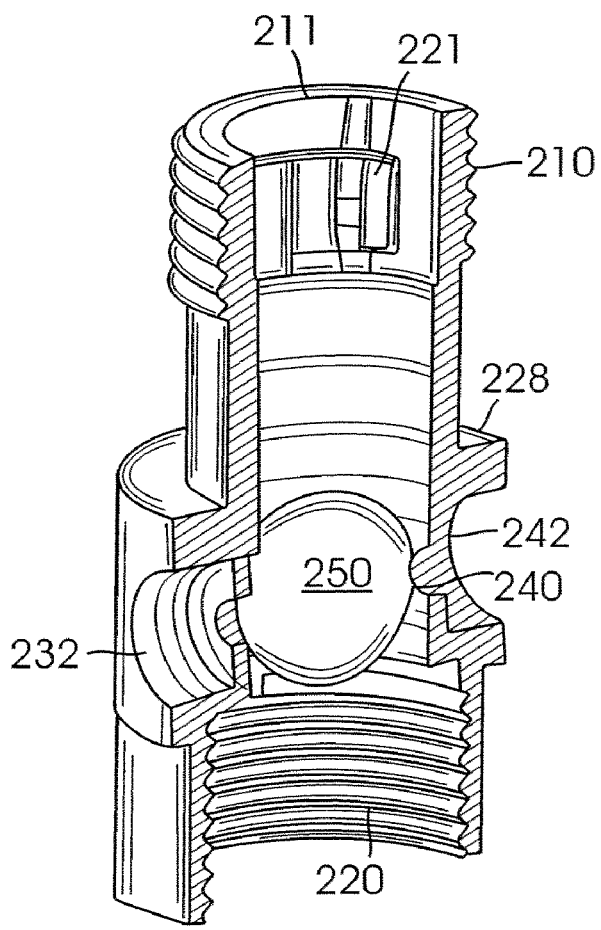
FIG. 2B is a cross-sectional perspective view along A-A' of FIG. 2A.
Figure 2C:
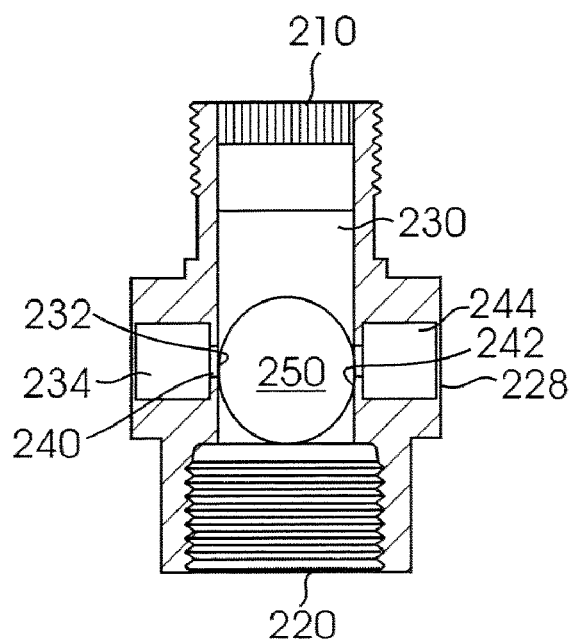
FIG. 2C is a further cross sectional view along A-A' of FIG. 2A.

As best shown in FIGS. 2B and 2C, the chamber 230 comprises an orifice 240 with a flow restricting and light blocking element 250 placed therein. The flow restricting and light blocking element 250 may take any desired shape, but is preferably cylindrical or spherical in shape, and may be formed of a plastic material, for example, a lightweight plastic, such as Deldrin, or the like. The diameter or width ("BD") is dimensioned to minimize foaming of a liquid passing thereby and to allow movement of the light blocking element 250 within the orifice 240, until it contacts and is stopped by the stop 221, during the passage of the liquid through the flow chamber 230, from the second port 220 to the first port 210. The light blocking element 250 restricts the flow of the liquid and prevents the liquid from foaming. The light blocking element 250, in its rest position, when there is no flow, efficiently blocks any light from the light emitting source 234 striking the light receiver or light sensors 244.

Figure 3:
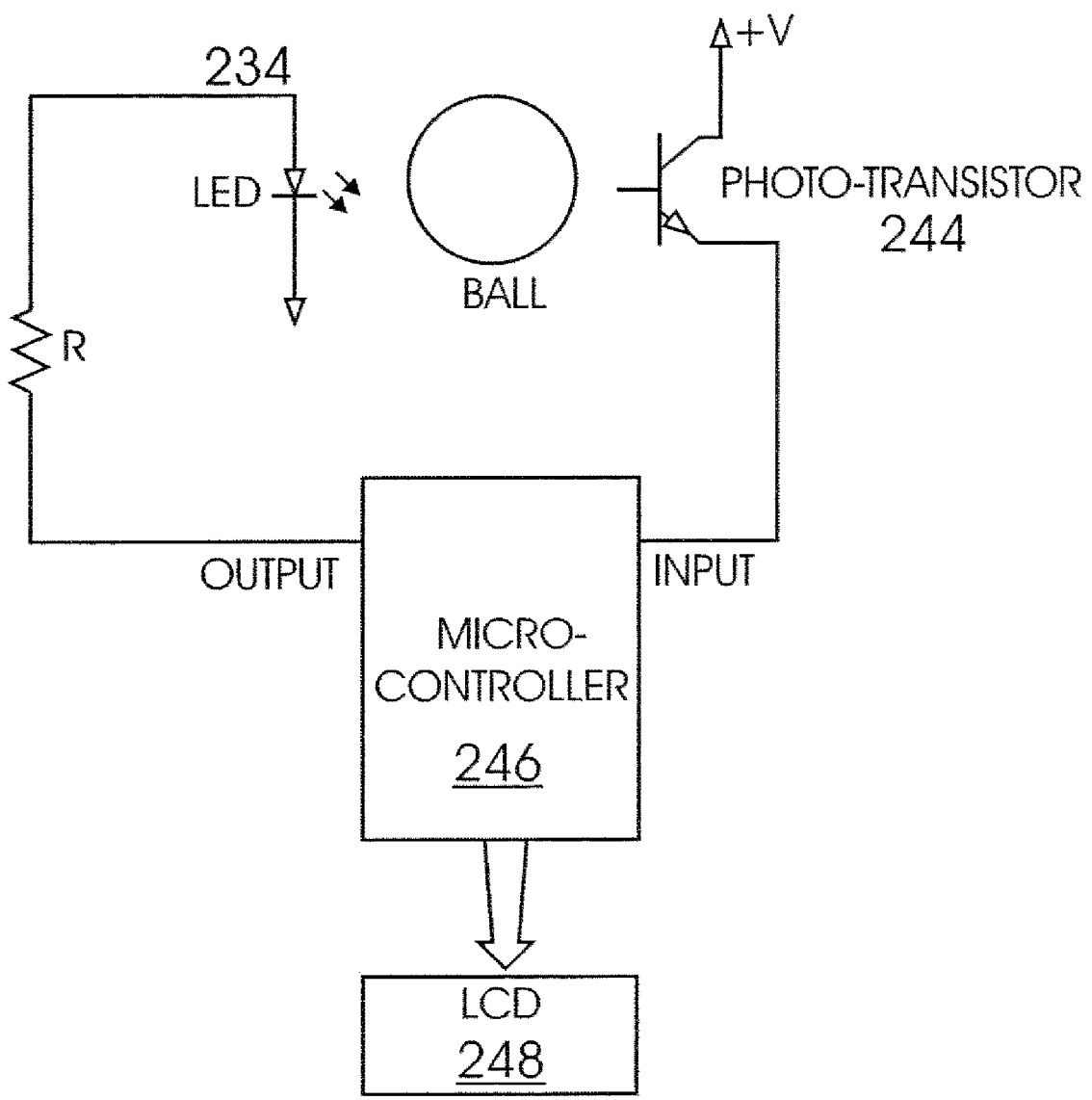
FIG. 3 is a circuit diagram depicting the communication between the light emitting source, a light receiver or light sensors, a microcontroller and the optical display, according to an aspect of the present invention.

As best shown in FIG. 3, a microcontroller or microprocessor 246 is provided in or connected to the housing 228 around the internal body portion 202, and is operatively connected to the light receiver or light sensors 244 and the light emitting source 234. The microprocessor 246 accurately monitors and tracks the quantity of liquid passing through the flow chamber and out the first port. The microprocessor 246 is further connected to an optical display 248 (as shown in FIG. 3), which provides a digital display of the quantity of liquid dispensed from the first port of the flow-metering device. The light receiver or light sensors 244 placed at the window 242 of the flow chamber 230 in the body 202 records the transmission of light, when the light blocking element 250 is moved out of the way, and communicating via the microprocessor 246, lights up the optical display 248. Microprocessor 246 keeps track of the liquid flowing between the inlet port 210 and the outlet port 220. The optical display 248 indicates how much liquid has been dispensed by the dispensing medium.

For purposes of this invention, the first port 210 diameter may be represented as "OutD", second port 220 diameter as "InD" and flow chamber 230 diameter as "FD". The first port diameter "OutD" and the second port diameter "InD" may be in the ratio of 1:1 to 1:2. The flow chamber diameter "FD" and the first port diameter "OutD" may be in the range of 2:1 to 1.5:1.

The flow chamber 230 has a minimum diameter of 2FD and a minimum height of 2FD. It is within the scope of the present invention to use non-cylindrical inlet and outlet ports. In that case "BD", "InD", "OutD", and "FD" would be considered as their equivalent diameters.

Further, the flow restricting and light blocking element 250 may be a ball having a diameter represented as "BD" while orifice 240 has a diameter represented as "OD". The ball diameter (BD) and the orifice diameter (OD) are in the ratio between 3:2 to 6:5, preferably, in the ratio of 5:4. The ball diameter "BD" is dimensioned to allow smooth and unhindered up and down movement of the ball within the orifice, between a rest position and a raised or flow position against the stop 221, when liquid flows through the flow chamber.

In the event of no flow, the flow restricting and light blocking element 250 is stationary within the orifice 240, as shown in FIGS. 2B and 2C. The flow restricting and light blocking element 250 blocks passage of any light from the light emitting source 234. In the absence of any illumination, the light receiver or light sensors 244 does not get any optical signal. In the absence of any optical signal, the microprocessor 246 is dormant and the optical display 248 does not show any change in its display values. The microprocessor 246 may include means to shut off power when the flow restricting and light blocking element 250 is in the rest position.

In performing the method of the present invention, when liquid passes through the second port 220, the pressure of the incoming liquid moves the flow restricting and light blocking element 250 away from its rest position and allows light to pass through the liquid in the orifice. With the passage of the liquid through the orifice, the pressure of the outgoing liquid applies pressure to the flow restricting and light blocking element 250 and it moves from its rest position. As explained, this movement of the flow restricting and light blocking element, prevents foaming of the liquid and allows passage of light from the light emitting source 234 to allow the light receiver or light sensors 244 to accurately record the optical signal. This change in optical signal is evaluated by the microprocessor 246. The microprocessor 246 updates the optical display 248. The change in the optical display 248 is in conformity to the amount of liquid passed through the flow chamber 230 and out the first or outlet port 210.

The flow metering device 200 of the present invention may be connected to any new or existing beverage dispensing system. A plurality of flow metering devices may be used simultaneously to monitor the total amount of liquid dispensed at a restaurant, party, bar or similar places where mass dispensing of liquids occur.

Figure 1B:
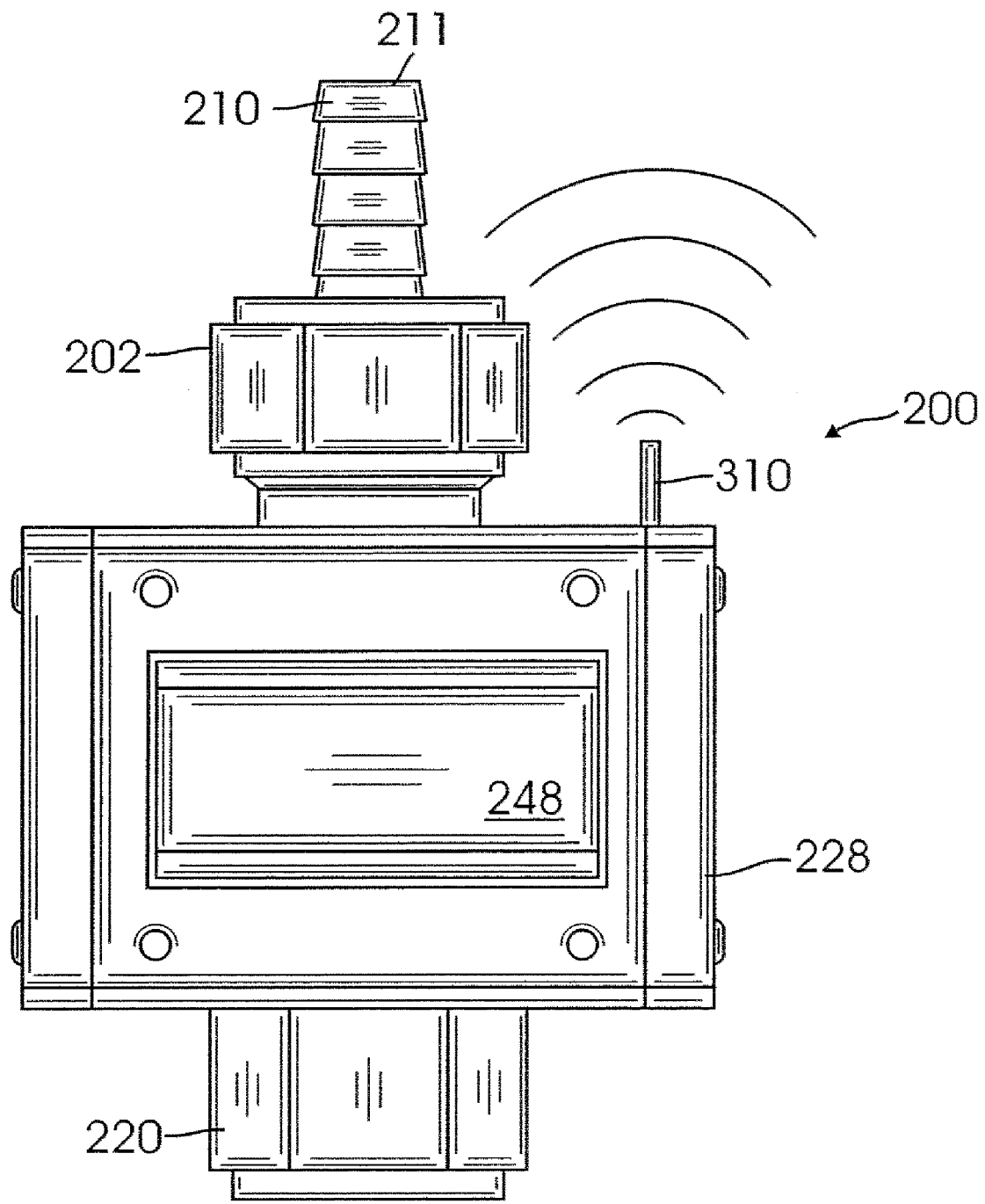
FIG. 1B is a front elevational view of the flow metering device having a signal transmitter providing remote access to the flow metering device.
Figure 1C:
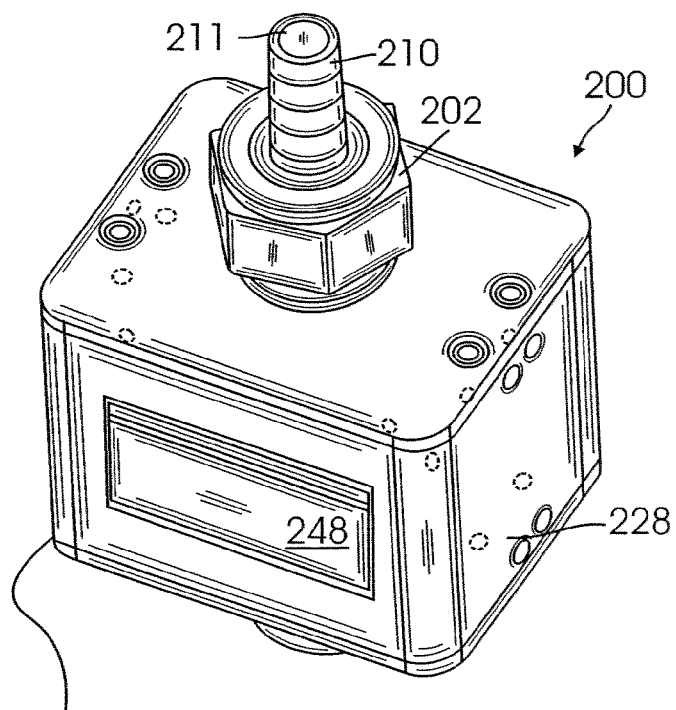
FIG. 1C is a front elevational view of the flow metering device connected via a cable to a computer for tracking flow of liquid from a liquid dispenser.
Figure 1C:
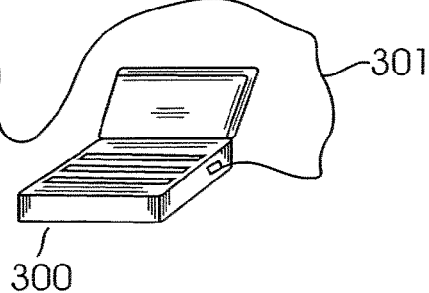

FIG. 1B show a flow metering device equipped with a RFID transmitter (310). Similarly, as shown in FIG. 1C, a flow metering device may be linked via a cable 301 to a computing device 300. The computing device 300 may keep track of liquids dispensed from one or more locations, within a time frame.

The flow metering device is designed to be both a self contained battery operated flow metering device and also have the capability of being powered by an outside source such as a computer or phone line. The flow metering devices can be run in series, i.e., "daisy chained" together and connected with a minimum four wire cabling design whether it be modern, such as using category cable, or non modern. Two of the four wires supply power in and out of the units and the other two wires transport information in and out of the units. A coded electronic pulse can be sent down the daisy chain whereby only the single flow metering device unit with the corresponding code will communicate with the computer. The computer monitors and logs information about that particular unit's activity when and only when it is being operated, i.e., when liquid flow is going through the flow metering device.

The computer will be pre-programmed with a custom software program that communicates properly with one or more flow metering devices at the same time. The program will have the capability of letting the user adjust the flow counter based on how many ounces actually flow through a flow metering device over a given period of time. For example: The computer will ask the user to follow a keystroke input procedure followed by a test of running ounces of beer through flow metering device #1. The computer will then recalibrate that amount of liquid as being 32 ounces and continue to count the remaining fluid running through only flow metering device #1 at that same rate.

This enables the user to change the monitoring accuracy of each flow metering device. This is necessary because each beverage holder, such as keg of beer, may have different circumstances associated with it, i.e., beers of different viscosities or beer kegs with different C02 or nitrogen pressures, all causing different flow rates. The flow metering devices are designed with both an input and output port for such cabling to be attached. Computer monitoring of one or more flow measuring devices is considered to be a part of this invention. It allows the users to have automated inventory and theft control of their product, produces a hard copy record and records exact times that flow occurred at each flow metering device location There may be situations where having cabling is too difficult to install or may cause penetration problems into the refrigerated area where beverage containers, such as beer kegs are used. The flow measuring device is also designed to have (RF) radio frequency capability removing the need for cabling. The flow measuring device would send a radio frequency to a receiver and that information would then be sent to the computer. The computer would operate the same as with cabling except that the information would be sent by radio frequency.

Those skilled in the art will appreciate that various adaptations and modifications of the just-described preferred embodiments may be configured without departing from the scope and spirit of the invention. Therefore, it is to be understood that, within the scope of the appended claims, the invention may be practiced other than as specifically described herein. Although the present disclosure has been described with reference to specific embodiments, these embodiments are illustrative only and not limiting. Many other applications and embodiments of the present disclosure will be apparent in light of this disclosure and the following claims.

We claim:

1. A flow metering device for monitoring flow of an aerated beverage, comprising:
    a housing having an inlet port and an outlet port;
    the housing including a flow chamber with a flow chamber area having an inlet area, an outlet area, and a pair of laterally placed windows at the inlet area;
    a light emitting source placed in a first of the pair of laterally placed windows and a light receiver placed in a second of the pair of laterally placed windows; and
    wherein the flow chamber area includes a flow restricting and light stopping element placed therein that blocks light from the light emitting source when the flow restricting and light stopping element is in a rest position, at the inlet area, when there is no flow of the aerated beverage from the inlet port.

2. The flow metering device of claim 1, wherein the flow chamber further including a microprocessor operatively connected thereto for tracking the amount of the aerated beverage dispensed.

3. The flow metering device of claim 1, wherein the flow restricting and light stopping element is spherical or circular in shape.

4. The flow metering device of claim 1, wherein the flow restricting and light stopping element and the flow chamber area have diameters that are in a ratio between 3:2 to 6:5.

5. The flow metering device of claim 1, wherein the inlet port diameter and the outlet port have diameters that are in a ratio of 1:1 to 1:2.

6. The flow metering device of claim 1, wherein the light emitting source is a light emitting diode or an incandescent lamp.

7. A flow metering device for monitoring flow of an aerated beverage, comprising:
    a body having an inlet port, an outlet port and a flow chamber formed therebetween;
    the flow chamber having an inlet area, an outlet area, and a pair of laterally placed windows at the inlet area;
    a light emitting source held in a housing surrounding the body and placed in one of the pair of laterally placed windows;
    a light receiver held in the housing surrounding the body and placed in a second of the pair of laterally placed windows;
    the flow chamber having a flow restricting and light stopping element held therein and movable between a first rest position wherein the flow restricting and light stopping element blocks light from the light emitting source and a second operating position, against a stop held in the outlet port, when there is flow of fluid there through and
    the flow chamber further including a microcontroller operatively connected thereto that tracks the amount of the aerated beverage dispensed.

8. The flow metering device of claim 7, wherein the flow restricting and light stopping element is spherical or circular in shape.

9. The flow metering device of claim 7, wherein the flow restricting and light stopping element and the flow chamber area have diameters that are in a ratio between 3:2 to 6:5.

10. The flow metering device of claim 7, wherein the inlet port diameter and the outlet port have diameters that are in a ratio of 1:1 to 1:2.

11. The flow metering device of claim 7, wherein the light emitting source is a light emitting diode or an incandescent lamp.

12. A flow metering device for monitoring flow of an aerated beverage, comprising:
    a body having an inlet port, an outlet port and a flow chamber formed therebetween;
    the flow chamber having an inlet area, an outlet area, and a pair of laterally placed windows at the inlet area;
    a housing surrounding the body and having a microcontroller held in the housing and operatively connected to the flow chamber that tracks the amount of the aerated beverage dispensed from the flow metering device;
    a light emitting source held in the housing and placed in one of the pair of laterally placed windows;
    a light receiver held in the housing and placed in a second of the pair of laterally placed windows;
    the flow chamber having a flow restricting and light stopping element held therein and movable between a first rest position wherein the flow restricting and light stopping element blocks light from the light emitting source and a second operating position, against a stop held in the outlet port, when there is flow of fluid there through.

13. The flow metering device of claim 12, wherein the flow restricting and light stopping element has a spherical or circular shape.

14. The flow metering device of claim 12, wherein the flow restricting and light stopping element and the flow chamber area have diameters that are in a ratio between 3:2 to 6:5.

15. The flow metering device of claim 12, wherein the inlet port diameter and the outlet port have diameters that are in a ratio of 1:1 to 1:2.

16. The flow metering device of claim 12, wherein the light emitting source is a light emitting diode or an incandescent lamp.

17. A method for monitoring flow of an aerated beverage, comprising the steps of:
   providing a body having an inlet port, an outlet port and a flow chamber formed therebetween;
   forming a pair of laterally placed windows in the flow chamber;
   forming a housing surrounding the body;
   placing a microcontroller in the housing and operatively connecting the microcontroller to the flow chamber for tracking the amount of liquid flowing through the flow metering device;
   providing a light emitting source in the housing adjacent one of the pair of laterally placed windows at the inlet port;
   providing a light receiver in the housing adjacent a second of the pair of laterally placed windows at the inlet port; and
   providing a flow restricting and light stopping element in the flow chamber, movable between a first rest position at the inlet wherein the flow restricting and light stopping element blocks light from the light emitting source and a second operating position when liquid passes through the flow chamber.

* * * * *